US012768205B2

(12) United States Patent
Rajagopal et al.

(10) Patent No.: US 12,768,205 B2
(45) Date of Patent: Oct. 20, 2026

(54) LOCK FOR A MOTOR VEHICLE, IN PARTICULAR A HOOD OR GATE LOCK

(71) Applicant: Kiekert AG, Heiligenhaus (DE)

(72) Inventors: Mandya Rajagopal, Wixom, MI (US); Bryan Bishop, Howell, MI (US); Adrin Wagner, Saline, MI (US)

(73) Assignee: Kiekert AG, Heiligenhaus (DE)

( * ) Notice: Subject to any disclaimer, the term of this patent is extended or adjusted under 35 U.S.C. 154(b) by 121 days.

(21) Appl. No.: 18/416,134

(22) Filed: Jan. 18, 2024

(65) Prior Publication Data

US 2025/0237095 A1 Jul. 24, 2025

(51) Int. Cl.
*E05B 83/24* (2014.01)
*E05B 81/14* (2014.01)
*E05B 81/18* (2014.01)
*E05B 81/20* (2014.01)
(Continued)

(52) U.S. Cl.
CPC ............ *E05B 83/243* (2013.01); *E05B 81/14* (2013.01); *E05B 81/18* (2013.01); *E05B 81/20* (2013.01); *E05B 81/28* (2013.01); *E05B 81/90* (2013.01)

(58) Field of Classification Search
CPC ........ E05B 83/24; E05B 83/243; E05B 81/14; E05B 81/18; E05B 81/20; E05B 81/22; E05B 81/28; E05B 81/90
See application file for complete search history.

(56) References Cited

U.S. PATENT DOCUMENTS 4,961,601 A * 10/1990 Lindholm ............... E05B 83/16 292/216
10,890,018 B2 * 1/2021 Distefano ............... E05B 83/24
11,572,721 B2 * 2/2023 Strole ..................... E05B 83/24
(Continued)

FOREIGN PATENT DOCUMENTS

CN 111305669 A * 6/2020 ............. E05B 81/06
CN 112112497 A * 12/2020 ............. E05B 83/24
(Continued)

OTHER PUBLICATIONS

Computer Generated Translation for DE 202020000157 U1, Generated on Mar. 18, 2026, https://worldwide.espacenet.com/ (Year: 2026).*

(Continued)

*Primary Examiner* — Alyson M Merlino
(74) *Attorney, Agent, or Firm* — Renner, Otto, Boisselle & Sklar

(57) ABSTRACT

This disclosure is directed to a hood lock for a motor vehicle, comprising a locking mechanism with a rotary latch and at least one pawl, a lock holder cooperating with the locking mechanism, a release lever, wherein the locked locking mechanism can be unlocked by means of the release lever, and wherein the lock holder can be transferred from a main latch position into a support position after a first actuation of the release lever, and wherein the lock holder can be transferred into a release position after a second actuation of the release lever, and a closure drive, wherein the locking mechanism can be transferred from the support position into the main latch position by means of the closure drive, and wherein at least one position of a locking mechanism part is detectable by means of a switching means, wherein the locking mechanism can be unlocked manually and electrically.

13 Claims, 1 Drawing Sheet

(51) Int. Cl.

| | |
|---|---|
| ***E05B 81/28*** | (2014.01) |
| ***E05B 81/90*** | (2014.01) |

(56) References Cited

U.S. PATENT DOCUMENTS

| | | | | |
|---|---|---|---|---|
| 11,859,416 | B2 | 1/2024 | Johann et al. | |
| 12,509,924 | B2 * | 12/2025 | Kim | E05B 83/24 |
| 2021/0172206 | A1 * | 6/2021 | Lim | E05B 83/24 |
| 2021/0293059 | A1 * | 9/2021 | Strole | E05B 83/24 |
| 2021/0370864 | A1 * | 12/2021 | Distefano | E05B 83/24 |

FOREIGN PATENT DOCUMENTS

| | | | | |
|---|---|---|---|---|
| DE | 29600386 | U1 | 5/1997 | |
| DE | 102008031206 | A1 | 1/2010 | |
| DE | 102008058419 | A1 | 5/2010 | |
| DE | 102010061518 | A1 | 4/2012 | |
| DE | 202020000157 | U1 * | 1/2020 | E05B 81/20 |
| DE | 102021119635 | A1 | 2/2023 | |
| JP | H0748920 | Y2 * | 11/1995 | |
| KR | 20190063319 | A * | 6/2019 | E05B 85/245 |
| WO | 2015139678 | A1 | 9/2015 | |
| WO | 2017025081 | A1 | 2/2017 | |
| WO | WO-2019038233 | A1 * | 2/2019 | E05B 83/26 |

OTHER PUBLICATIONS

Computer Generated Translation for JP H0748920 Y2, Generated on Mar. 18, 2026, https://www.j-platpat.inpit.go.jp/ (Year: 2026).*

* cited by examiner

LOCK FOR A MOTOR VEHICLE, IN PARTICULAR A HOOD OR GATE LOCK

FIELD OF DISCLOSURE

The invention relates to a hood or gate lock for a motor vehicle, comprising a locking mechanism with a rotary latch and at least one pawl, a lock holder cooperating with the locking mechanism, a release lever, wherein the locked locking mechanism can be unlocked by means of the release lever and wherein the lock holder can be transferred from a latch position into a support position after a first actuation and the lock holder can be transferred into a release position after a second actuation of the release lever, and a closure drive, wherein the latch can be transferred from the support position into the main latch position by means of the closure drive and wherein at least one position of a locking mechanism part can be detected by means of a switching means.

BACKGROUND OF DISCLOSURE

Locks or locking systems for motor vehicles are used where doors, gates or movable components have to be held at motor vehicles in order to ensure safe driving of the motor vehicle. While the primary purpose of the locking systems is to hold the movable components in their closed position, convenience functions take more and more prominence. In the case of gates, it is particularly important to ensure safe closing and easy opening.

Engine hoods or gates can be closed by means of a seal so that they a seal against water or dirt, for example, is provided. A seal ensures that when the lock is closed, the locking mechanism as a securing element is subjected to a counterpressure.

In the case of engine hoods or gates, a lock holder is preferably and generally attached to the engine hood or gate, which then interacts with the vehicle lock. The lock holder usually interacts with a locking mechanism of the associated motor vehicle door lock. The lock holder and the motor vehicle lock generally define the motor vehicle closure. The lock holder, in conjunction with the locking mechanism in the motor vehicle lock, ensures a secure and reliable closure. In principle, the reverse can also be done.

Due to the primary locking function of the lock holder in conjunction with the locking mechanism in the vehicle lock, it is on the one hand a particularly safety-relevant component, which on the other hand is exposed to particular loads, especially in the event of an accident. In fact, the protection of vehicle occupants in the event of an accident depends to a large extent on how reliably the lock holder and the locking mechanism interacting therewith are able to absorb the forces acting on them. Thus it is essential that the components disposed movable at the motor vehicle remain closed, or that the hood or gate remains closed, so that the safety devices provided in or at the motor vehicle, such as brake assist, side airbags, side impact protection, etc., can develop the desired effect.

The locking mechanism included in the motor vehicle lock has a pre-latch or hold, support or catch position and a main latch position. In the case of hood or gate locks, a two-stroke actuation is provided. With a first stroke acting on the motor vehicle lock via a Bowden cable or by means of an electric motor drive, for example, the lock holder is transferred from the main latch position (closed gate) into a pre-latch, support or catch position. This prevents the gate from opening fully in the event of unintentional actuation of the Bowden cable, thus endangering the driver or passengers. The gate or hood is only fully released when the Bowden cable is pulled twice or the drive is operated electrically or a lever is operated manually.

DE 296 00 386 U1 describes a front gate lock of the type described above. The front gate lock cooperates with a striker. The front gate lock is usually arranged at the front end of a motor vehicle and interacts with a striker of a front gate. The striker is pivotably mounted at the front gate and can be pivoted from a normal position to an alternative position against the restoring force of a striker spring. This is done with the aid of an actuating handle which can be operated by the user when the striker is in a pre-latch position. The striker is then swiveled out of its path of movement and can swivel around the hook end. When the closure is closed, the striker and in particular a web forming the end of the striker slides along the control flank of the catch hook, which in the prior art is firmly connected to the lock housing. The catch hook passes over the end of the control flank and is then displaced back by the tensioned catch hook spring so that it assumes a rear engagement position relative to the latching flank. When the striker is displaced further, the latter enters a locking jaw of a rotary catch, which rotates as the striker is displaced further and is secured in a locking position by a pawl.

From DE 10 2010 061 518 A1 a front gate lock with a catch hook associated with a lock housing for catching a striker is known, wherein the catch hook comprises a control flank and a latching flank which lies in the path of movement of the striker which can escape from its path of movement, that the latter, when the front gate is closed, initially slides along the control slope of the catch hook, which is fixed relative to the lock housing in the catching position, and, after the end of the catch hook has passed over, moves into a pre-latch position behind the latching flank, and with a locking jaw of a rotary latch, into which the striker engages in an open position of the rotary latch after a further displacement of the front gate in the closing direction and is held in a locking position of the rotary latch secured by a pawl, wherein the catch hook is fixedly connected to the rotary latch and the rotary latch is pivotally blocked into its open position by a spring-loaded ejector arm, which pivotal blocking is released by displacement of the ejector arm upon entry of the striker into the locking jaw.

In order to be able to transfer the lock from a support position to the main latch position with the electromotive assistance, for example in order to increase the operating comfort in the motor vehicle, it has become known from unpublished DE 10 2021 119 635 A1 to transfer the hood lock from the support position to the main latch position by means of a closure drive. In order to control the closure drive, the position of the rotary latch can be detected by a switching means.

SUMMARY OF DISCLOSURE

It is an object of the invention to improve the aforementioned front gate lock with respect to control technology. In addition, it is the object of the invention to make the lock as a whole simpler in construction and more cost-effective.

Advantageous embodiments of the invention are provided in the claims. It is pointed out that the exemplary embodiments described in the following are not limiting, rather any variations of the features described in the description and the subclaims are possible.

The object of the invention is achieved by providing a hood lock for a motor vehicle, comprising a catch with a rotary latch and at least one pawl, a lock holder cooperating with the catch, a release lever, wherein the locked catch can be unlocked by means of the release lever and wherein the lock holder can be transferred from a latch position into a support position after a first actuation and the lock holder can be transferred into a release position after a second actuation of the release lever, and a closure drive, wherein the catch can be transferred from the support position into the main latch position by means of the closure drive and wherein at least one position of the rotary latch can be detected by means of a switching means and wherein the catch can be manually and electrically unlocked. The design of the hood lock according to the invention now makes it possible to provide a hood lock that is equipped with a high degree of security. In particular, the optional manual and electromotive operation of the hood lock offers a high degree of functional safety. Even in the event of a power failure in the motor vehicle and in particular in the area of the hood lock, the hood can be unlocked and opened by manual operation. This offers in particular an advantage if the electrical power supply, such as may be present in electric vehicles, is disposed in the area of the hood.

In a further development of the invention, an advantage then arises if the release lever can be actuated manually and electromotively, preferably directly. In an advantageous manner, the release lever can be actuated manually so that the catch can be unlocked. As explained above, the release lever acts directly on the pawl and can release the pawl from the engagement area with the rotary latch. Depending on the position of the rotary latch, i.e. in the main latch position, the support position or the release position of the rotary latch, the pawl assumes different positions.

An actuation of the release lever consequently causes an interaction between the release lever, the pawl and the rotary latch. The actuation of the release lever enables the pawl to be disengaged from the rotary latch so that the catch can be unlocked. According to the invention, both manual actuation and electromotive actuation of the release lever are possible. Depending on the operator's preference, the release lever can thus be moved electrically or manually. Preferably, the release lever is actuated directly manually or is swiveled electromotively. Direct action on the release lever provides a high degree of safety, since the release lever itself is actuated.

In a preferred embodiment, a linear drive is provided for electromotive actuation of the release lever. A linear drive thus offers a cost-effective way of actuating the release lever. In particular, the release lever can be actuated by simple constructive means during a pivotal movement of the release lever. It is advantageous if the release lever abuts spring-biased at the linear drive. On the one hand, this enables good acoustic behavior when opening the hood lock, because the linear drive is always in contact with the release lever. On the other hand, this offers the advantage that manual actuation of the release lever is also possible at the same time without having to actuate or move the linear drive. The release lever thus abuts spring-biased at the linear drive or a linear actuator and preferably at a buffer element of the linear drive.

In a further variant embodiment, the linear drive is designed as an integral drive, in particular comprising a spindle drive. An integral drive, i.e. a drive which is designed as a separate component and comprises a separate housing, can be mounted as a separate component at the motor vehicle lock and in particular within the motor vehicle lock. This means that existing drives, i.e. linear drives, can be used, which greatly simplifies the constructive design. In other words, an existing linear drive is used to actuate the release lever. The compact structural unit can be mounted directly in the vehicle lock, so that only mounting points in the vehicle lock and a power supply or control line for actuating the linear drive need to be provided.

Preferably, a spindle drive has proven to be advantageous, since on the one hand a sufficient actuating force and a sufficient operating displacement can be provided by the spindle drive in order to meet the requirements for a safe unlocking of the locking mechanism. In other words, on the one hand, a sufficient release force can be transmitted to the release lever to actuate the pawl and, on the other hand, depending on the operating displacement of the release lever in the different latch positions, a sufficient operating displacement or pivoting angle can be introduced into the release lever. In addition, spindle drives can be manufactured at low cost, which in turn has a positive effect on the manufacture of the hood lock.

If the linear drive is attached to a reinforcing plate of the hood lock, again an advantageous variant embodiment of the invention can be achieved. Fastening the linear drive to the reinforcing plate offers the advantage that a stable bearing for the linear drive in the motor vehicle lock can be provided. In particular, if large forces have to be transmitted by the linear drive, this can provide a sufficient supporting force. Higher forces can be present at the release lever, for example, if the vehicle lock has not been operated for a long time, dirt has settled in the locking mechanism, low temperatures make it difficult for the hood lock components to move easily and/or if, for example, the vehicle lock is subject to increased stresses due to an accident. These conditions are, of course, only mentioned by way of example; what is essential here is that the linear drive is able to introduce a high force into the release lever due to the stable bearing.

As already described above and according to the invention, the release lever can also be operated manually. For this purpose, it has been found that it can be advantageous if the release lever can be actuated by means of a Bowden cable. The Bowden cable offers a safe alternative to the electric drive and can be easily integrated into the motor vehicle. In addition, the lock case can serve as a counter-bearing for actuating the release lever. In addition to the bearing of the Bowden cable for manual actuation of the release lever, the lock case can also serve as a receptacle and counter-bearing for the closure drive. Preferably, the closure drive is arranged at a distance from the hood lock and connected to the hood lock via a further Bowden cable. The Bowden cable core then projects into the lock case or hood lock and can be connected to the closure lever mechanism. The use of a Bowden cable for manual actuation of the release lever offers the advantage that the hood can be opened when the vehicle is de-energized. In addition, the Bowden cable can also transmit high forces if, for example, the vehicle is warped in the event of an accident or weather-related influences cause high release forces at the hood lock.

In an advantageous manner, the reinforcement plate can simultaneously serve at least as a bearing point for the closure drive, the release lever and the pawl. The reinforcement plate can thus have a multifunctionality. The reinforcing plate basically serves to provide additional stability to the motor vehicle lock. For this purpose, the reinforcement plate is attached to the lock case via bolts and/or axles and is formed from a steel sheet. The fastening to the lock case and the interaction between the lock case and the reinforcing plate stabilizes the hood lock as a whole. If the reinforcing plate is now also used as a stabilizing means for the closure drive, the release lever and the pawl, a high level of security can be provided in the hood lock. Furthermore, the reinforcing plate can hold the linear drive, so that a variety of functions and safety-relevant aspects can be provided in the hood lock by means of the reinforcing plate. Here, metallic axles serve as bearing points, which are arranged between the lock case and the reinforcing plate and which are preferably connected to the lock plate and the lock case by means of a forming process, in particular riveting.

In a further variant embodiment, the reinforcing plate serves as a bearing point for a lifting device. A lifting device serves as a means for moving the hood, i.e. the lifting device acts on the lock holder by means of a spring force and lifts the hood from the main latch position into the support position or the pre-latch position and holds the hood in the support position, so that after the rotary latch has been released from the support position, the hood can be moved into or held in an open position. In the open position, the operator can grasp the hood and open it completely. Due to the plurality of components, pawl, release lever and lifting device, a hood lock can be provided with minimal constructive effort and a minimal number of components. At the same time, however, adequate security can be provided in the hood lock by the support provided by the reinforcing plate.

In the following, the invention is explained in more detail with reference to the accompanying drawings by means of a preferred exemplary embodiment. However, the basic principle applies that the invention is not limited by the exemplary embodiment, but merely represents a design embodiment. The illustrated features can be implemented individually or in combination with further features of the description as well as the claims.

IN THE DRAWING

DETAILED DESCRIPTION

Figure 1:
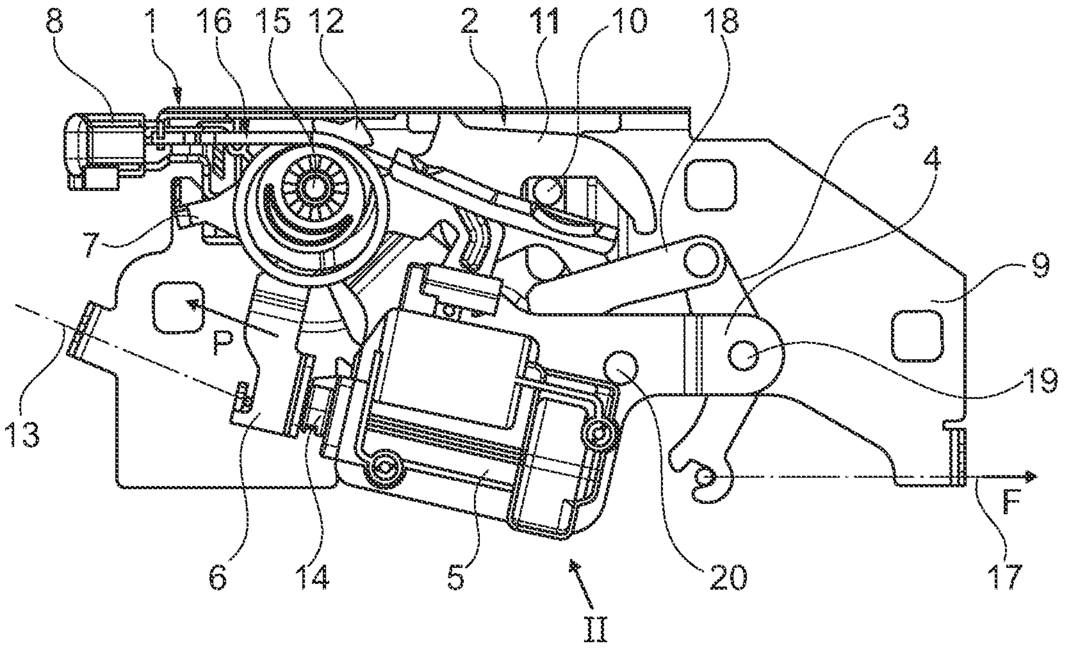
FIG. 1 is a side view of a hood lock designed according to the invention in a main latch position.

FIG. 1 shows a side view of a hood lock 1 comprising a locking mechanism 2, a closure drive 3, a reinforcing plate 4, a linear drive 5, a release lever 6, a lifting device 7 and an electric component carrier 8. All components of the hood lock 1 are mounted at a lock case 9. The hood lock 1 is shown in a main latch position, that is, the hood is in a closed position and a lock holder 10 is held in a main latch position. The linear drive 5, the release lever 6 and the closure drive 3 are in an unactuated position.

The locking mechanism 2 is in a main latch position, wherein the rotary latch 11 is locked in its movement by means of a pawl 12. In order to transfer the illustrated locking mechanism 2 from the main latch position to a first support position, the release lever 6 can be actuated electromotively by means of the linear drive 5 or manually by means of a Bowden cable 13. In order to actuate the release lever 6, a plunger 14 of the linear drive is moved out of the linear drive 5 or is manually pulled at the Bowden cable 13 so that the release lever 6 performs a swiveling movement in the direction of the arrow P. In this case, the release lever 6 swivels around the axle 15. The swiveling movement of the release lever 6 releases the pawl 12 from engagement with the rotary latch 11 and the rotary latch 11 can be transferred to a first support position in which the rotary latch 11 can in turn be held by the pawl 12.

In the support position, the lock holder 10 is held in the support position by means of the lifting device 7, i.e. the lifting device 7 moves the lock holder 10 and the rotary latch 11 into the support position. In this case, the lifting device 7 is spring-biased by means of a leg spring 16 so that a sufficient supporting force can be exerted on the lock holder 10. After a second actuation of the release lever 6, again in the direction of the arrow P, the rotary latch 11 reaches a release position in which an operator is able to open the hood completely. In other words, the lock holder 10 is released from the rotary latch 11. In this release position, the lock holder is in turn held in position by the lifting device 7 so that the rotary latch 11 cannot fall back into the support position again.

In order to close the hood lock 1, the hood is then moved against the force of the lifting device 7 into the support position, in which a switching means detects the closed position, or the pre-latch position, of the locking mechanism 2 so that the locking mechanism 2 can be transferred back from the support position to the main latch position.

In order to transfer the locking mechanism from the support position to the main latch position or the closed position of the hood, a closure force F is applied to the closure drive by means of a Bowden cable 17 so that a closure lever 18 can transfer the locking mechanism 2 from the pre-latch position to the main latch position in cooperation with the rotary latch 11. The main latch position of the locking mechanism 2 is in turn detected by means of a further switching means, so that a control of the closure drive 3 is possible by means of the switching means at the locking mechanism 2. The position of the pawl 12 as well as the position of the rotary latch 1 can respectively be detected separately by at least one switching means in order to detect the movement of the rotary latch into the support position and into the release position on the one hand and on the other hand to monitor the time of actuation of the closure drive 3 and the control of the closure drive 3 when the locking mechanism 2 is closed.

As can be clearly seen in FIG. 1, the reinforcement plate 4 overlaps almost all functionally relevant components in the hood lock 1. Thus, the linear drive 5 is mounted at the reinforcement plate 4, wherein the reinforcement plate 4 itself accommodates the bearing axes of the lifting device 7, the release lever 6, the storage lever 21 and the drive lever of the linear drive 3. The axles 15, 19, 20 are each connected to the lock case 9 and the reinforcing plate 4. Here, a screw connection as a detachable connection or a non-detachable connection in the form of a riveting can be provided, for example. The reinforcing plate 4 thus supports the functional elements of the closure drive 3, the release lever 6, the lifting device 7 and the pawl 12 in common. The design of the hood lock 1 according to the invention allows a high level of functionality to be achieved in the hood lock 1 with a minimum of constructive effort and a minimum number of components.

Figure 2:
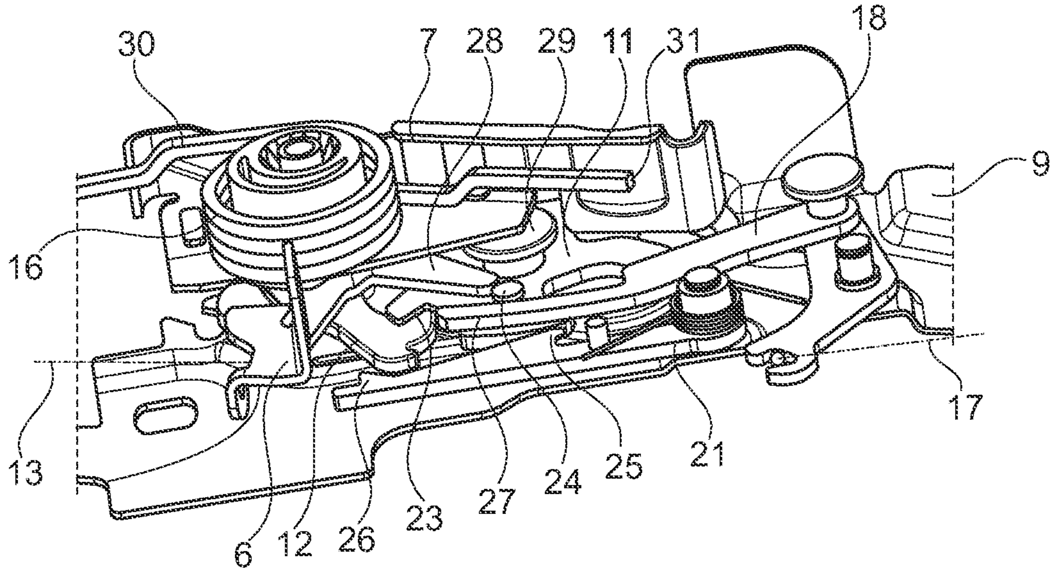
FIG. 2 is a view of the hood lock according to FIG. 1 from a view of an arrow II, wherein the hood lock is shown without reinforcement plate and linear drive.

FIG. 2 shows a view of the hood lock 1 from the direction of an arrow II, wherein neither the reinforcement plate 4 nor the linear drive 5 are shown. Again, the main latch position of locking mechanism 2 is shown. FIG. 2 shows the interaction between the pawl 12 and the rotary latch 11, wherein the main latch 23 between the pawl 12 and the rotary latch 11 can be seen. In order to transfer the locking mechanism into the main latch position, the closure lever 18 engages a bolt 24 at the rotary latch 11. If the locking mechanism 2 is finally in an open position, the pawl 12 is held by means of the storage lever 21 in a position in which the pawl 12 cannot re-engage with the rotary latch 11. For this purpose, a control contour 25 at the storage lever 21 disengages from the rotary latch 11 in such a way that the storage lever 21 is moved spring-biased in the direction of the rotary latch 11 and a latch contour 26 engages with the pawl 12. The pawl 12 is held out of engagement from the rotary latch 11 until the rotary latch 11 moves back into the support position. In this case, the control contour 25 releases the pawl 12 again, so that the pawl 12 can again be moved spring-biased in the direction of the rotary latch.

Furthermore, an extension 27 can be seen at the closure lever 18, which guides the closure lever 18 against the bolt 24, so that a safe closure of the locking mechanism 2 can be ensured. The closure lever 18 can in turn abut spring-biased against the rotary latch 11. A control lever 28 comes to abut against an axle 29 of the rotary latch 11 in the main latch position of the locking mechanism 2, so that an exact positioning of the release lever can be achieved. Moreover, the leg spring 16 can be seen, which abuts against the lock case 9 with a first leg 30 and exerts a force onto the lifting device 7 with a second leg 31.

LIST OF REFERENCE SYMBOLS

1 hood lock
2 locking mechanism
3 closure drive
4 reinforcing plate
5 linear drive
6 release lever
7 lifting device
8 electrical component carrier
9 lock case
10 lock holder
11 rotary latch
12 pawl
13, 17 Bowden cable
14 plunger
15, 19, 20, 29 axle
16 leg spring
18 closure lever
21 storage lever
23 main latch
24 bolt
25 control contour
26 latch contour
27 extension
28 leg
30 first leg
31 second leg
P arrow
F closure force

The invention claimed is:

1. A hood lock for a motor vehicle, the hood lock comprising:

a locking mechanism with a rotary latch and a pawl, a lock holder cooperating with the locking mechanism, a release lever that acts directly on the pawl, wherein the locking mechanism is unlocked by a first actuation and a second actuation of the release lever, the locking mechanism is transferred from a main latch position into a support position after the first actuation of the release lever, wherein in the support position, the pawl engages the rotary latch to hold the locking mechanism in the support position, and the locking mechanism is transferred into a release position after the second actuation of the release lever, which causes the pawl to separate from the rotary latch, and a closure drive and at least one switch, wherein the locking mechanism is transferred from the support position into the main latch position by operation of the closure drive, and wherein at least one position of the rotary latch or the pawl is detectable by the at least one switch, and wherein the release lever is both manually and electromotively actuatable, so as to allow the locking mechanism to be manually and electrically unlocked, wherein the release lever is manually actuatable for the first actuation and the second actuation to manually unlock the locking mechanism without requiring electromotive actuation.

2. The hood lock according to claim 1, further comprising a linear drive for electromotively actuating the release lever.

3. The hood lock according to claim 2, wherein the release lever abuts the linear drive in a spring-biased manner.

4. The hood lock according to claim 2, wherein the linear drive comprises a spindle drive.

5. The hood lock according to claim 2, further comprising a reinforcing plate, wherein the linear drive is fastened to the reinforcing plate.

6. The hood lock according to claim 5, wherein the reinforcing plate simultaneously serves as a bearing point for the closure drive, the release lever, and the pawl.

7. The hood lock according to claim 5, wherein the reinforcing plate serves as a bearing point for a lifting device for lifting a hood of the motor vehicle.

8. The hood lock according to claim 1, further comprising a Bowden cable, wherein the release lever is manually actuatable by operation of the Bowden cable.

9. The hood lock according to claim 8, further comprising a lock case, wherein the lock case operates as a bearing for the Bowden cable.

10. The hood lock according to claim 1, further comprising:

a linear drive for electromotively actuating the release lever, a reinforcing plate, wherein the linear drive is fastened to the reinforcing plate, a Bowden cable, wherein the release lever is manually actuatable by operation of the Bowden cable, and a lock case, wherein the lock case operates as a bearing for the Bowden cable, wherein the lock case is fastened to the reinforcing plate.

11. The hood lock according to claim 10, further comprising a plunger that operates on the release lever, wherein during the electromotive actuation of the release lever, operation of the linear drive moves the plunger to actuate the release lever, and during the manual actuation of the release lever, operation of the Bowden cable moves the release lever.

12. The hood lock according to claim 1, wherein the closure drive includes a closure lever that operates on the locking mechanism to transfer the locking mechanism from the support position to the main latch position.

13. The hood lock according to claim 12, wherein the closure lever has an extension that engages with a protruding member on the rotary latch to transfer the locking mechanism from the support position to the main latch position.

* * * * *